(12) United States Patent
Carlson et al.

(10) Patent No.: US 11,807,074 B2
(45) Date of Patent: Nov. 7, 2023

(54) VEHICLE CABIN COMFORT MANAGEMENT SYSTEM

(71) Applicant: GM GLOBAL TECHNOLOGY OPERATIONS LLC, Detroit, MI (US)

(72) Inventors: Michael H. Carlson, Farmington Hills, MI (US); Kyle Holihan, South Lyon, MI (US); Cameron Paul Smith, Milford, MI (US); Anthony James Donatelli, Waterford, MI (US); Lawrence P. Ziehr, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/555,915

(22) Filed: Dec. 20, 2021

(65) Prior Publication Data
US 2023/0191880 A1    Jun. 22, 2023

(51) Int. Cl.
*B60H 1/32*    (2006.01)

(52) U.S. Cl.
CPC ......... *B60H 1/3204* (2013.01); *B60H 1/3205* (2013.01)

(58) Field of Classification Search
CPC .......................... B60H 1/3204; B60H 1/3205; B60H 1/32281; B60H 1/32284; B60H 1/323
See application file for complete search history.

(56) References Cited

U.S. PATENT DOCUMENTS

| | | | |
|---|---|---|---|
| 10,953,726 B2 | 3/2021 | Carlson et al. | |
| 11,065,936 B2 | 7/2021 | Gonze | |
| 11,072,259 B2 | 7/2021 | Gonze | |
| 11,446,978 B2 * | 9/2022 | Bara | B60H 1/32281 |
| 2017/0297407 A1 * | 10/2017 | Shan | B60H 1/00278 |

* cited by examiner

*Primary Examiner* — Marc E Norman
(74) *Attorney, Agent, or Firm* — CANTOR COLBURN LLP

(57) ABSTRACT

A thermal management system for a vehicle includes a plurality of fluid flow circuits including a heating ventilation and air conditioning (HVAC) circuit circulating a flow of refrigerant therethrough and including an evaporator, a chiller heat exchanger, a first expansion valve located upstream of the evaporator, a second expansion valve located upstream of the chiller heat exchanger, and a heat exchanger located fluidly upstream of the expansion valves. A propulsion cooling circuit circulates a flow of coolant therethrough which is utilized to condition one or more propulsion components of the vehicle. The flow of coolant is directed through the heat exchanger, thus subcooling the flow of refrigerant. A controller is operably connected to one or more control points of the thermal management system and is configured to adjust the one or more control points to achieve a target amount of subcooling of the flow of refrigerant at the heat exchanger.

20 Claims, 2 Drawing Sheets

VEHICLE CABIN COMFORT MANAGEMENT SYSTEM

INTRODUCTION

The subject disclosure relates to thermal management systems for motor vehicles, and in particular to cabin heating, ventilation and air conditioning systems and the operation thereof.

While traditional systems and methods of thermal management in vehicles having thermal combustion engines are well established and may be utilized in part in innovative propulsion systems such as battery electric vehicles (BEVs), hybrid electric vehicles, or fuel cell vehicles, the amount of available excess thermal energy is much lower than in an internal combustion engine system. Thus, there is a need for improved thermal management systems and methods which efficiently collect, store and distribute thermal energy to vehicle systems.

SUMMARY

In one embodiment, a thermal management system for a vehicle includes a plurality of fluid flow circuits including a heating ventilation and air conditioning (HVAC) circuit circulating a flow of refrigerant therethrough. The HVAC circuit includes an evaporator, a chiller heat exchanger arranged in a parallel relationship with the evaporator, a first expansion valve located upstream of the evaporator, a second expansion valve located upstream of the chiller heat exchanger, and a heat exchanger is located fluidly upstream of the first expansion valve and the second expansion valve. A propulsion cooling circuit circulates a flow of coolant therethrough. The flow of coolant is utilized to condition one or more propulsion components of the vehicle. The flow of coolant is directed through the heat exchanger to exchange thermal energy with the flow of refrigerant, thus subcooling the flow of refrigerant. A controller is operably connected to one or more control points of the thermal management system. The controller is configured to adjust the one or more control points to achieve a target amount of subcooling of the flow of refrigerant at the heat exchanger.

Additionally or alternatively, in this or other embodiments the one or more control points include a coolant heater of the propulsion cooling circuit, a propulsion conditioning circuit pump, or a compressor of the HVAC circuit.

Additionally or alternatively, in this or other embodiments the one or more propulsion system components include a rechargeable energy storage system.

Additionally or alternatively, in this or other embodiments a drive unit cooling circuit circulates a flow of drive coolant therethrough to provide cooling of one of more drive units of the vehicle. The drive unit cooling circuit operably connected to the propulsion cooling circuit at a drive unit cooling circuit heat exchanger.

Additionally or alternatively, in this or other embodiments a drive unit cooling circuit pump urges the flow of drive coolant along the drive unit cooling circuit.

Additionally or alternatively, in this or other embodiments the one or more control points includes the drive unit cooling circuit pump.

Additionally or alternatively, in this or other embodiments a low temperature radiator is located along the drive unit cooling circuit.

Additionally or alternatively, in this or other embodiments the one or more control points include a flow rate of drive coolant through the low temperature radiator.

In another embodiment, a method of operating a thermal management system includes providing a plurality of fluid flow circuits including a heating ventilation and air conditioning (HVAC) circuit circulating a flow of refrigerant therethrough, and a propulsion cooling circuit circulating a flow of coolant therethrough. The propulsion cooling circuit is fluidly connected to the HVAC circuit at a heat exchanger. An amount of subcooling of the flow of refrigerant to be provided to one or more expansion valves located fluidly downstream of the of the heat exchanger is selected. A target coolant temperature and a target coolant flow rate into the heat exchanger to reach the selected amount of subcooling are determined. One or more control points of the thermal management system are adjusted to achieve the target coolant temperature and the target coolant flow rate.

Additionally or alternatively, in this or other embodiments the target coolant temperature is selected utilizing a saturation temperature of the flow of refrigerant and an HVAC circuit load.

Additionally or alternatively, in this or other embodiments the target coolant flow rate is selected utilizing the saturation temperature of the flow of refrigerant, the HVAC circuit load and a temperature of the flow of coolant.

Additionally or alternatively, in this or other embodiments one or more of the target coolant temperature or the target coolant flow rate are adjusted based on an amount heat rejection in the flow of coolant at a chiller of the thermal management system fluidly upstream of the heat exchanger.

Additionally or alternatively, in this or other embodiments the one or more control points include a coolant heater of the propulsion conditioning circuit, a propulsion conditioning circuit pump, or a compressor of the HVAC circuit.

Additionally or alternatively, in this or other embodiments the flow of coolant is utilized to condition one or more propulsion components of a vehicle.

Additionally or alternatively, in this or other embodiments the thermal management system includes a drive unit cooling circuit circulating a flow of drive coolant therethrough to provide cooling of one of more drive units of the vehicle. The drive unit cooling circuit is operably connected to the propulsion cooling circuit at a drive unit cooling circuit heat exchanger.

Additionally or alternatively, in this or other embodiments the flow of drive coolant is urged along the drive unit cooling circuit via a drive unit cooling circuit pump.

Additionally or alternatively, in this or other embodiments the one or more control points includes the drive unit cooling circuit pump.

Additionally or alternatively, in this or other embodiments a low temperature radiator is located along the drive unit cooling circuit.

Additionally or alternatively, in this or other embodiments the one or more control points include a flow rate of drive coolant through the low temperature radiator.

In yet another embodiment, a non-transitory computer-readable medium contains instructions to cause a controller to perform a method of operating a thermal management system. The method includes providing a plurality of fluid flow circuits including a heating ventilation and air conditioning (HVAC) circuit circulating a flow of refrigerant therethrough, and a propulsion cooling circuit circulating a flow of coolant therethrough, the propulsion cooling circuit fluidly connected to the HVAC circuit at a heat exchanger. An amount of subcooling of the flow of refrigerant to be provided to one or more expansion valves disposed fluidly downstream of the of the heat exchanger is selected, a target coolant temperature and a target coolant flow rate into the heat exchanger are selected to reach the selected amount of subcooling, and one or more control points of the thermal management system are adjusted to achieve the target coolant temperature and the target coolant flow rate.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
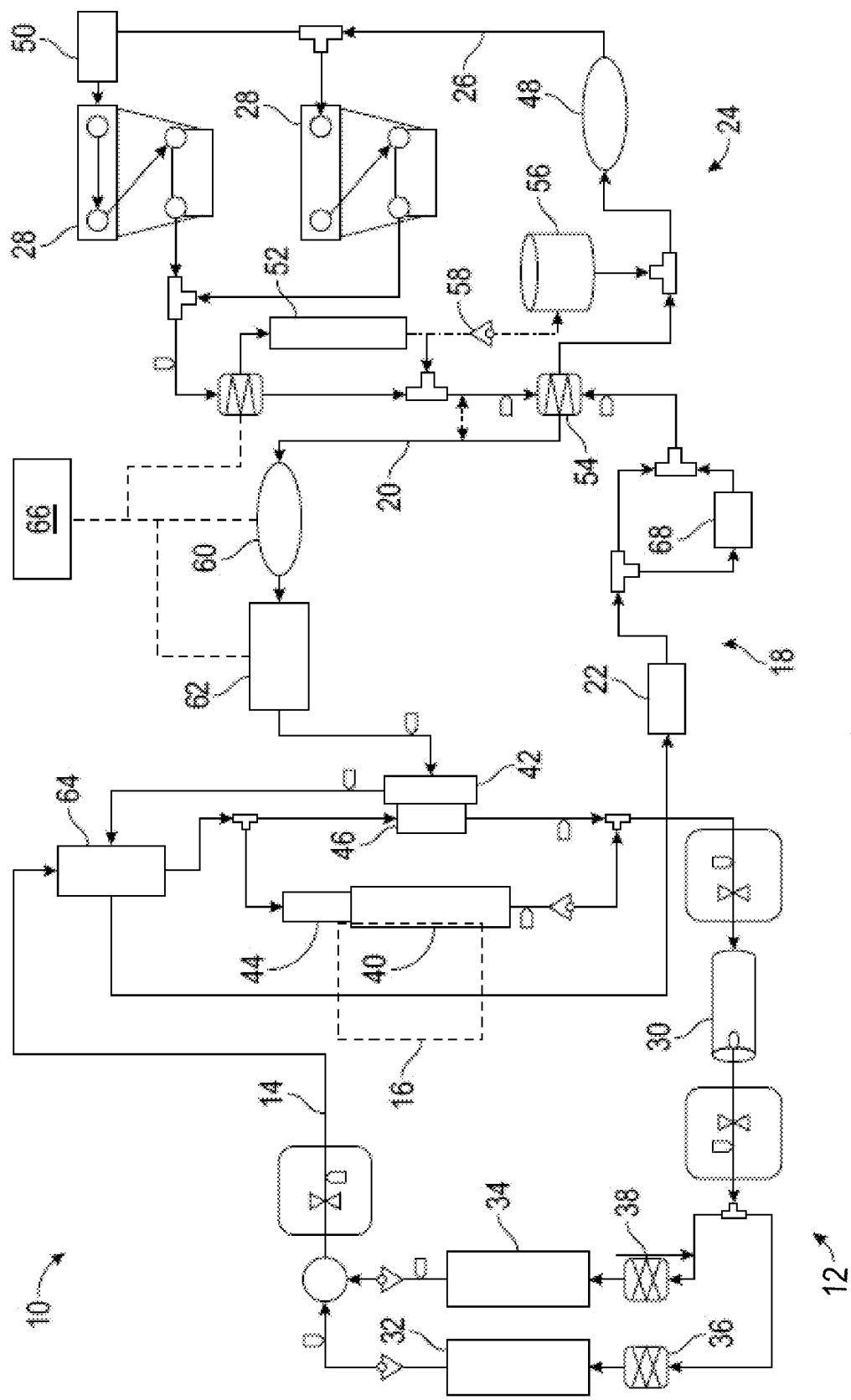
FIG. 1 is a schematic illustration of an embodiment of a thermal management system for a vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment, a schematic illustration of a thermal management system 10 for a vehicle is shown in FIG. 1. The thermal management system 10 includes multiple interconnected fluid flow circuits to manage thermal energy needs of the various vehicle systems and components. A first fluid flow circuit is a heating, ventilation and air conditioning (HVAC) circuit 12. The HVAC circuit 12 circulates a flow of refrigerant along a refrigerant pathway 14 and utilizes the flow of refrigerant to condition, for example, a cabin 16 of the vehicle by providing either heat or cooling airflow to the cabin 16. A second fluid flow circuit is a propulsion conditioning circuit 18. The propulsion conditioning circuit 18 circulates a flow of coolant along a propulsion conditioning pathway 20 and utilizes the flow of coolant to maintain propulsion components, for example a rechargeable energy storage system (RESS) 22, fuel cell, or the like, at a desired operational temperature. The RESS 22 may be one or more of electric rechargeable traction batteries, electric double-layer capacitors or flywheel energy storage. One skilled in the art will readily appreciate that the discussion of utilizing the RESS 22 in the present application is merely exemplary, and that other propulsion system components may be utilized in the propulsion conditioning circuit 18. A third fluid flow circuit is a drive unit cooling circuit 24 which circulates a flow of drive unit coolant along a drive cooling pathway 26. The flow of drive unit coolant is utilized to cool one or more drive units 28 of the vehicle, which in some embodiments are operably connected to the RESS 22 and may de driven utilizing energy from the RESS 22. Each fluid flow circuit is described in greater detail below.

The HVAC circuit 12 includes a compressor 30 that compresses and urges the flow of refrigerant along the refrigerant pathway 14. The HVAC circuit 12 includes a front end condenser 32 and a heating condenser 34 arranged in parallel, with the flow of refrigerant selectable flowed through the front end condenser 32 and/or the heating condenser 34 by operation of respective front end condenser valve 36 and the heating condenser valve 38. From the heating condenser 34 and the front end condenser 32, the flow of refrigerant is directed toward an evaporator 40 and one or more chillers 42, which are arranged in a fluidly parallel relationship with the evaporator 40. A first expansion 44 and a second expansion valve 46 located fluidly upstream of the evaporator 40 and the chiller 42, respectively. From the evaporator 40 and the chiller 42, the flow of refrigerant is returned to the compressor 30.

The drive unit cooling circuit 24 circulates the flow of drive coolant along the drive cooling pathway 26 as urged by a drive cooling unit circuit pump 48. From the drive unit cooling circuit pump 48, the drive coolant flows through the drive units 28 to provide cooling thereto. In some embodiments, such as illustrated, the vehicle includes two drive units 28, while in other embodiments other quantities of drive units 28 may be arranged along the drive unit cooling circuit 24, and/or more than one drive unit cooling circuits 24 may be utilized to cool the drive units 28. As illustrated in FIG. 1, the drive units 28 are arranged in a fluidly parallel arrangement in the drive unit cooling circuit 24, while in other embodiments the drive units 28 may be arranged serially. An onboard charging module (OBCM) 50 is located between the drive unit cooling circuit pump 48 and the drive units 28 such that the flow of drive coolant absorbs thermal energy from the OBCM 50 and the drive units 28. The flow of drive coolant is returned to the drive unit cooling circuit pump 48, optionally through a low temperature radiator 52 and through a drive unit cooling circuit heat exchanger 54. In some embodiments, excess drive coolant is directed to a surge tank 56 until needed by the drive unit cooling circuit 24. A check valve 58 may be disposed between the low temperature radiator 52 and the surge tank 56 to control the flow of drive coolant into the surge tank 56.

The propulsion conditioning circuit 18 is thermally connected to both the HVAC circuit 12 and the drive unit cooling circuit 24. The flow of coolant is driven along the propulsion conditioning pathway 20 via a propulsion conditioning circuit pump 60. The flow of coolant proceeds to a coolant heater 62 that, when activated, heats the flow of coolant. From the coolant heater 62, the flow of coolant proceeds to the chiller 42, where the flow of coolant exchanges thermal energy with the flow of refrigerant in the HVAC circuit 12, heating the refrigerant and cooling the coolant. From the chiller 42, the flow of coolant proceeds to a heat exchanger 64, for example, a coaxial tube heat exchanger, positioned along the propulsion conditioning circuit 18 fluidly downstream of the chiller 42, and in the HVAC circuit 12 fluid upstream of the first expansion valve 44 and the second expansion valve 46. At the heat exchanger 64, the cooled flow of coolant output from the chiller 42 exchanges thermal energy with the flow of refrigerant to subcool the flow of refrigerant prior to the flow of refrigerant reaching the first expansion valve 44 and the second expansion valve 46. The flow of coolant then proceeds to the RESS 22 to thermally condition the RESS 22 and then through the drive unit cooling circuit heat exchanger 54 to exchange thermal energy with the flow of drive coolant before returning to the propulsion conditioning circuit pump 60. In some embodiments, the flow of coolant may be used to cool other components, such as a charge port 68 of the vehicle. A controller 66 is operably connected to one or more control points of the thermal management system 10 to control operation thereof.

Figure 2:
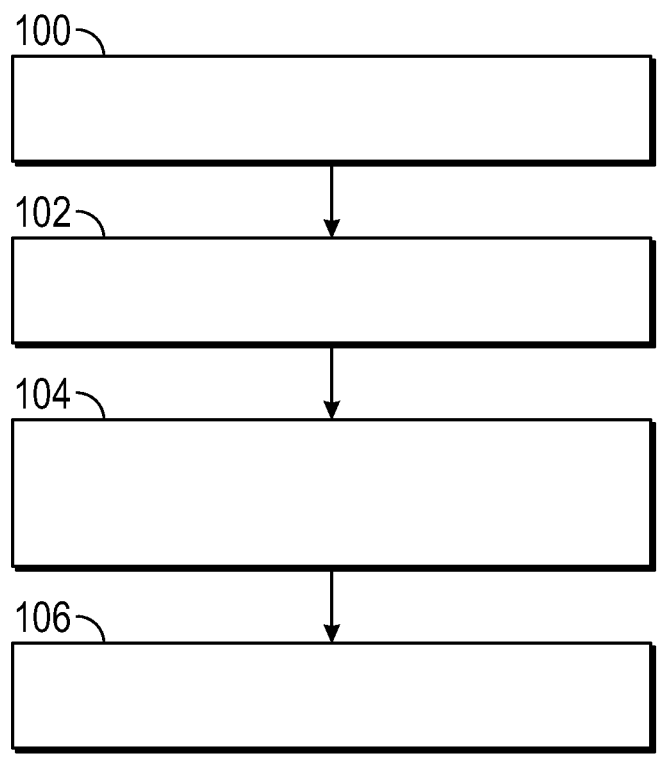
FIG. 2 is a schematic illustration of an exemplary method of operating a thermal management system for a vehicle.

Referring now to FIG. 2, a method is utilized to operate the thermal management system 10 to provide a desired amount of subcooling in the flow of refrigerant entering the first expansion valve 44 and the second expansion valve 46. This is achieved by monitoring and modifying parameters, such as flow rate and temperature, of the flow of coolant entering the heat exchanger 64. A target refrigerant subcooling temperature is determined at block 100, and from this a target coolant temperature and target coolant flow rate are selected at block 102. The target coolant temperature may be selected utilizing, for example, a saturation temperature of the flow of refrigerant and the HVAC circuit 12 load. Similarly, the target coolant flow rate of the flow of coolant may be selected utilizing the saturation temperature of the flow of refrigerant, the HVAC circuit 12 load and a temperature of the flow of coolant. At block 104 an adjusted coolant target temperature and an adjusted coolant flow rate are determined taking into account heat rejection in the flow of coolant occurring at the chiller 42, and/or other heat loads. To achieve the adjusted coolant target temperature and the adjusted coolant flow rate, one or more control points of the thermal management system 10 are adjusted at block 106. The control points include, for example, a speed of propulsion conditioning circuit pump 60 to adjust coolant flow rate, flow of the drive coolant through the low temperature radiator 52 and/or into the surge tank 56, which changes the flow of drive coolant through the drive unit cooling circuit heat exchanger 54. Additionally, operation of the coolant heater 62 may be changed to adjust the coolant temperature.

In addition, as discussed, one or more processes 100-106 may be implemented in hardware, firmware, software, or any combination thereof. Exemplary embodiments may also be implemented as instructions stored on a non-transient, non-transitory machine-readable medium. These are readable and executable by one or more processors. A machine-readable medium includes any mechanism for storing or transmitting information in a form readable by a machine (e.g. a computing device). The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium includes the following: an electrical connection having one or more wires, a portable computer diskette, a hard disk, a random-access memory (RAM), an erasable programmable read-only memory (EPROM or Flash memory), an optical fiber, a portable compact disc read-only memory (CD-ROM), an optical storage device, a magnetic storage device, or any suitable combination of the forgoing.

Providing the heat exchanger 64 and preconditioning the flow of coolant entering the heat exchanger 64 based on operating parameters of the HVAC circuit 12 allows for the flow coolant to provide a selected amount of subcooling to the flow of refrigerant at the heat exchanger 64, prior to the flow of refrigerant flowing to the first expansion valve 44 and the second expansion valve 46.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A thermal management system for a vehicle, comprising:
    a plurality of fluid flow circuits including:
        a heating ventilation and air conditioning (HVAC) circuit circulating a flow of refrigerant therethrough, the HVAC circuit including:
            an evaporator;
            a chiller heat exchanger arranged in a parallel relationship with the evaporator;
            a first expansion valve disposed upstream of the evaporator;
            a second expansion valve disposed upstream of the chiller heat exchanger; and
            a propulsion cooling circuit heat exchanger disposed fluidly upstream of the first expansion valve and the second expansion valve; and
        a propulsion cooling circuit circulating a flow of coolant therethrough, the flow of coolant utilized to condition one or more propulsion components of the vehicle, the flow of coolant directed through the propulsion cooling circuit heat exchanger to exchange thermal energy with the flow of refrigerant, thus subcooling the flow of refrigerant; and
    a controller operably connected to one or more control points of the thermal management system, the controller configured to adjust the one or more control points to achieve a target amount of subcooling of the flow of refrigerant at the propulsion cooling circuit heat exchanger.

2. The thermal management system of claim 1, wherein the one or more control points include a coolant heater of the propulsion cooling circuit, a propulsion conditioning circuit pump, or a compressor of the HVAC circuit.

3. The thermal management system of claim 1, wherein the one or more propulsion system components includes a rechargeable energy storage system.

4. The thermal management system of claim 1, further comprising an additional component cooling circuit circulating a flow of drive component coolant therethrough to provide cooling of one of more additional components of the vehicle, the additional component cooling circuit operably connected to the propulsion cooling circuit at an additional component cooling circuit heat exchanger.

5. The thermal management system of claim 4, further comprising an additional component cooling circuit pump to urge the flow of drive component coolant along the additional component cooling circuit.

6. The thermal management system of claim 5, wherein the one or more control points includes the additional component cooling circuit pump.

7. The thermal management system of claim 4, further comprising a radiator disposed along the additional component cooling circuit.

8. The thermal management system of claim 7, wherein the one or more control points include a flow rate of components coolant through the low temperature radiator.

9. A method of operating a thermal management system, including:
    providing a plurality of fluid flow circuits including:
        a heating ventilation and air conditioning (HVAC) circuit circulating a flow of refrigerant therethrough; and
        a propulsion cooling circuit circulating a flow of coolant therethrough, the propulsion cooling circuit fluidly connected to the HVAC circuit at a propulsion cooling circuit heat exchanger;

selecting an amount of subcooling of the flow of refrigerant to be provided to one or more expansion valves disposed fluidly downstream propulsion cooling circuit heat exchanger;

determining a target coolant temperature and a target coolant flow rate into the propulsion cooling circuit heat exchanger to reach the selected amount of subcooling;

adjusting one or more control points of the thermal management system to achieve the target coolant temperature and the target coolant flow rate.

10. The method of claim 9, wherein the target coolant temperature is selected utilizing a saturation temperature of the flow of refrigerant and an HVAC circuit load.

11. The method of claim 9, wherein the target coolant flow rate is selected utilizing the saturation temperature of the flow of refrigerant, the HVAC circuit load and a temperature of the flow of coolant.

12. The method of claim 9, further comprising adjusting one or more of the target coolant temperature or the target coolant flow rate based on an amount heat rejection in the flow of coolant at a chiller of the thermal management system fluidly upstream of the propulsion cooling circuit heat exchanger.

13. The method of claim 9, wherein the one or more control points include a coolant heater of the propulsion cooling circuit, a propulsion conditioning circuit pump, or a compressor of the HVAC circuit.

14. The method of claim 9, wherein the flow of coolant is utilized to condition one or more propulsion components of a vehicle.

15. The method of claim 9, wherein the thermal management system includes an additional component cooling circuit circulating a flow of component coolant therethrough to provide cooling of one of more additional components of the vehicle, the additional component cooling circuit operably connected to the propulsion cooling circuit at an additional component cooling circuit heat exchanger.

16. The method of claim 15, further comprising urging the flow of component coolant along the additional component cooling circuit via a additional component cooling circuit pump.

17. The method of claim 16, wherein the one or more control points includes the additional component cooling circuit pump.

18. The method of claim 15, further comprising a radiator disposed along the additional component cooling circuit.

19. The method of claim 18, wherein the one or more control points include a flow rate of component coolant through the radiator.

20. A non-transitory computer-readable medium containing instructions to cause a controller to perform a method of operating a thermal management system, the method including:

providing a plurality of fluid flow circuits including:
a heating ventilation and air conditioning (HVAC) circuit circulating a flow of refrigerant therethrough; and
a propulsion cooling circuit circulating a flow of coolant therethrough, the propulsion cooling circuit fluidly connected to the HVAC circuit at a propulsion cooling circuit heat exchanger;

selecting an amount of subcooling of the flow of refrigerant to be provided to one or more expansion valves disposed fluidly downstream propulsion cooling circuit heat exchanger;

determining a target coolant temperature and a target coolant flow rate into the heat exchanger to reach the selected amount of subcooling;

adjusting one or more control points of the thermal management system to achieve the target coolant temperature and the target coolant flow rate.

* * * * *